US012809867B2

(12) United States Patent
Eich et al.

(10) Patent No.: US 12,809,867 B2
(45) Date of Patent: Nov. 24, 2026

(54) DEEPEST-ONLY SCHEDULING

(71) Applicant: SAP SE, Walldorf (DE)

(72) Inventors: Marius Eich, Neustadt (DE); Christina Teflioudi, Heidelberg (DE); Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/358,270

(22) Filed: Jul. 25, 2023

(65) Prior Publication Data

US 2025/0036627 A1 Jan. 30, 2025

(51) Int. Cl.
*G06F 16/2455* (2019.01)
*G06F 16/2453* (2019.01)

(52) U.S. Cl.
CPC .... *G06F 16/2455* (2019.01); *G06F 16/24542* (2019.01)

(58) Field of Classification Search
CPC ....................... G06F 16/2455; G06F 16/24542
USPC .......................................................... 707/718
See application file for complete search history.

(56) References Cited

U.S. PATENT DOCUMENTS 4,363,097 A * 12/1982 Amano ................. F02P 5/1502 701/114
8,826,284 B1 * 9/2014 Fuller ................... G06F 9/5088 718/103
10,540,355 B1 * 1/2020 Agnich ................... G06F 16/25
11,327,795 B1 * 5/2022 Mundra .............. G06F 11/3433
2004/0025160 A1 * 2/2004 Dice ....................... G06F 9/526 718/102
2007/0028240 A1 * 2/2007 Hayakawa .......... G06F 11/3636 718/100
2007/0101339 A1 * 5/2007 Shrum .................. H04L 47/805 718/104
2007/0118838 A1 * 5/2007 Tsujino ................. G06F 9/4881 718/103
2010/0228650 A1 * 9/2010 Shacham ............ G06F 16/2455 707/769
2011/0193988 A1 * 8/2011 Hatano ................. G06F 15/167 348/222.1
2011/0209154 A1 * 8/2011 Gooding ................. G06F 9/467 718/103
2014/0082626 A1 * 3/2014 Busaba ................. G06F 9/5016 718/104
2015/0067691 A1 * 3/2015 Johnson ................ G06F 9/5027 718/103
2017/0031713 A1 * 2/2017 Campbell ............. G06F 9/4881
2018/0075100 A1 * 3/2018 Park .................... G06F 16/9024
2019/0114202 A1 * 4/2019 Wang .................... G06F 9/5044
(Continued)

*Primary Examiner* — Cam Linh T Nguyen
(74) *Attorney, Agent, or Firm* — Mintz Levin Cohn Ferris Glovsky and Popeo, P.C.

(57) ABSTRACT

In some implementations, there is provided executing a query execution plan for a query; setting a first flag to indicate to a plurality of worker threads to stop executing tasks in a first queue of a memory stack; pushing into the memory stack, a second queue containing one or more exclusive tasks associated with the query; setting a second flag to indicate to the plurality of worker threads to resume working; and in response to the second queue being empty of the one or more exclusive tasks, setting a third flag to indicate to the plurality of worker threads to stop executing tasks in the second queue, and setting a fourth flag to indicate to the plurality of worker threads to resume working on the tasks in the first queue.

9 Claims, 9 Drawing Sheets

(56) References Cited

U.S. PATENT DOCUMENTS

| | | | | |
|---|---|---|---|---|
| 2019/0121666 | A1* | 4/2019 | Tsuchiya | G06F 9/544 |
| 2019/0179667 | A1* | 6/2019 | Kan | G06F 9/4881 |
| 2020/0073987 | A1* | 3/2020 | Perumala | G06F 16/24545 |
| 2020/0174698 | A1* | 6/2020 | Fang | G06F 3/067 |
| 2020/0301898 | A1* | 9/2020 | Samynathan | G06F 16/24542 |
| 2021/0026684 | A1* | 1/2021 | Giri | G06F 9/4881 |
| 2022/0121443 | A1* | 4/2022 | Baronne | G06F 9/3004 |
| 2022/0308919 | A1* | 9/2022 | Atmakur | G06F 9/485 |
| 2023/0029198 | A1* | 1/2023 | Guevin | H04L 67/10 |
| 2023/0106369 | A1* | 4/2023 | Flynn | G06N 20/00 718/103 |
| 2023/0315652 | A1* | 10/2023 | Tsirkin | G06F 9/5088 710/310 |
| 2023/0376486 | A1* | 11/2023 | Trigonakis | G06F 9/5066 |

* cited by examiner

300

DEEPEST-ONLY SCHEDULING

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for a method that includes executing a query execution plan for a query; setting a first flag to indicate to a plurality of worker threads to stop executing tasks in a first queue of a memory stack; pushing into the memory stack, a second queue containing one or more exclusive tasks associated with the query; setting a second flag to indicate to the plurality of worker threads to resume working; and in response to the second queue being empty of the one or more exclusive tasks, setting a third flag to indicate to the plurality of worker threads to stop executing tasks in the second queue, popping the second queue from the memory stack, the popping removing the second queue from the memory stack and enabling access to tasks in the first queue, and setting a fourth flag to indicate to the plurality of worker threads to resume working on the tasks in the first queue.

In some variations, one or more features disclosed herein including one or more of the following features may be implemented as well. A database execution engine may receive the query from a client device. During execution of the query execution plan, a task scheduler comprised in a database execution engine may receive a request for exclusive scheduling of the one or more exclusive tasks. The request may causes the setting of the first flag to indicate to the plurality of worker threads to stop executing tasks in the first queue of the memory stack. The first flag may causes the plurality of worker threads to sleep, such that execution of the tasks in the first queue stops. The pushing the one or more exclusive tasks into the memory stack may insert the one or more exclusive tasks into the memory stack. The pushing the one or more exclusive tasks into the memory stack may inhibit access to the tasks in the first queue. The inhibited access to the tasks in the first queue may inhibit the plurality of worker threads from accessing the tasks in the first queue. The setting of the second flag may cause the plurality of worker threads to resume access the one or more exclusive tasks in the second queue.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
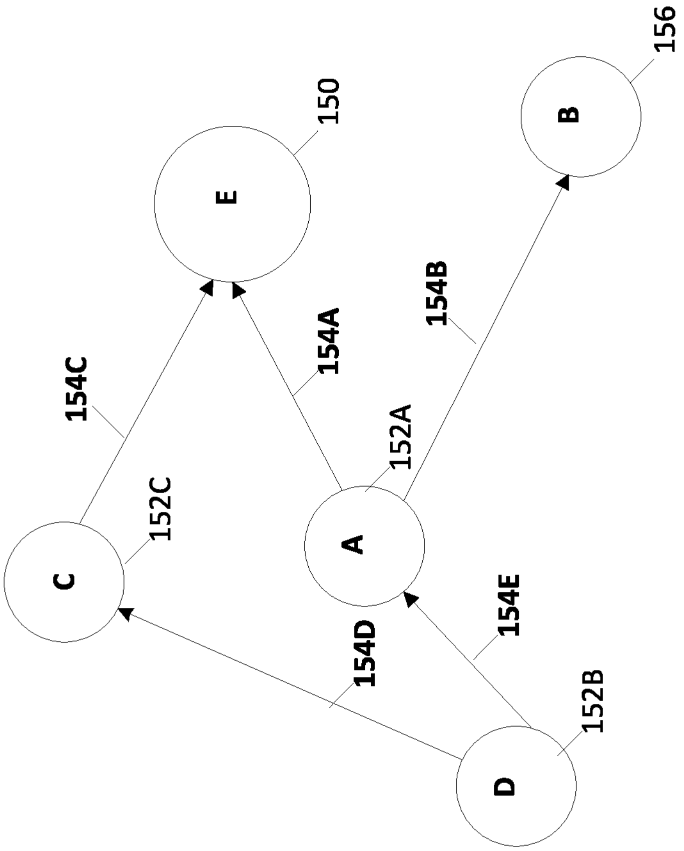
FIG. 1A depicts an example of a portion of a directed acyclic graph of operators, in accordance with some example implementations.

An in-memory relational database may utilize main memory for the primary storage of database tables. For example, the in-memory relational database may be implemented as a column-oriented database (e.g., a columnar database) that stores data from database tables by columns instead of by rows. In the case of the in-memory column-oriented relational database for example, each tuple may correspond to a record occupying a row of a database table while the columns of the database table may store the values of common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by a central processing unit (CPU) of the computing engine, transactions accessing the in-memory database may be executed to provide near-instantaneous results.

Moreover, a database execution engine (which may also be referred to as a query execution engine or an execution engine, for short) may also use pipelining. In the case of pipelining, the database execution engine breaks up data of for example a table (or a column of the table) for example into smaller chunks of data, such that each smaller chunk of data can be processed for execution by a series of one or more operators. The operators refer to low-level executable operators, such as code that performs a specific operation during operator execution, rather than high-level relational algebra operators (also referred to as relations). In other words, when a query is received, the query may be expressed in the form of relational algebra but then formed into executable operators for execution. For example, the low-level executable operator may implement a lock on a database table, perform an index scan, perform a table scan at a given database, and/or the like.

During query plan generation (which may include query optimization), the relational algebra operators (or the corresponding executable operators) may be connected with each other to form a relation of operators such as a graph (e.g., a directed acyclic graph (DAG)). Operators with no outgoing links may split the DAG up into multiple pipelines. For example, a pipeline ends on an operator with no outgoing links and starts with an operator after the previous pipeline ended. Pipeline execution may be performed in a recurrent fashion, such that operator "n" of the pipeline takes a chunk of data as input, performs its operation ("n") on the input data, and then the operator "n" pushes its corresponding output to the next operator "n+1". After the last operator in the pipeline is done performing its operation, control is returned to a prior operator. For example, when operator n+1 is finished, execution control may return to a prior operator n. The operator n may (or may not) continue processing (for example, producing another piece of data and pushing it down the pipeline of operators, performing a cleanup task, freeing resources, and/or the like). In other words, the pipeline represents a set of data processing elements (e.g., operators) connected in series, such that during query execution the output of an operator of the pipeline is the input of the next element of the pipeline, and buffer storage may be used between the operators. In some instances, the operators of a pipeline can be executed in parallel, sequentially, and/or in a time-sliced fashion.

FIG. 1A illustrates an example of a portion of a directed acyclic graph (DAG) for a pipeline where the circles correspond to operators 150, 152A-C, and 156, which are connected by links 154A, 154B, 154C, 154D, and 154E. The operators of a pipeline may, as noted, form or represent a directed acyclic graph, and each operator may have one or more outgoing links (which are used to push chunks of data during execution) to one or more other operators. Likewise, each operator may have one or more incoming links (which provide data to the operator) from one or more other operators.

The throughput and storage capacity of a database, such as the in-memory column-oriented relational database as well as other types of databases, may be maximized by distributing the processing and storage of data across multiple computing nodes. A single database table may therefore be divided into multiple partitions (or internal tables), for example, through hash partitioning, round-robin partitioning, and/or range partitioning, and then stored across multiple computing nodes. Doing so may maximize opportunities for parallelization in which a single query is divided into multiple tasks and assigned to individual worker threads for execution. As used herein, the term "worker thread" refers to a thread or thread of execution, which is a sequence of instructions managed independently by a scheduler, such as a task scheduler. Individual worker threads (e.g., the corresponding sequences of instructions) may be scheduled for sequential execution and/or parallel execution by one or multiple central processing units (CPUs) configured to provide a task scheduler for the work threads.

Figure 1B:
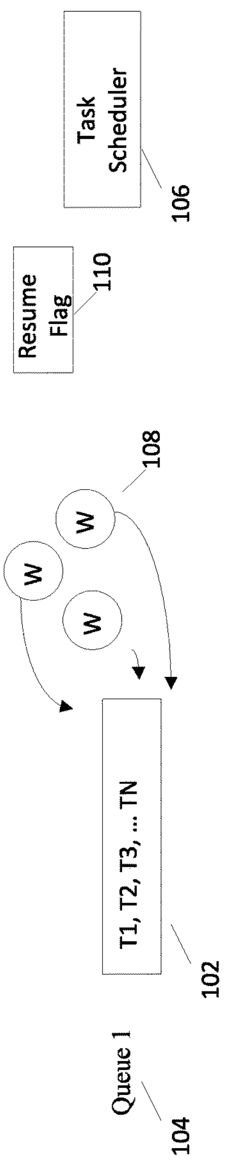
FIGS. 1B, 1C, 1D, and 1E, and 1F depict exclusive scheduling of tasks, in accordance with some example implementations.

When a query is received and a query plan is generated, the database execution engine may execute the query via the query plan (also referred to as a query execution plan). The executable operators of the query plan may result in one or more tasks that need to be executed. FIG. 1B depicts an example of the tasks 102 (e.g., task T1, task T2, task T3, and so forth through task TN) in a first queue 104 of tasks. The tasks represent work packages (e.g., an operation and data). The task scheduler 106 (which is in-memory and part of the database execution engine) schedules the tasks 102 in the first queue 104 for execution by worker threads 108 (labeled "W"). In operation, the task scheduler may prioritize the sequence of the tasks 102 and control the operation of the worker threads using, for example, flags (e.g., a semaphore). For example, when the task schedule sets the flag to resume 110, the worker threads (which from time to time check the flag) continue to work by selecting a task (e.g., a work package which may include an operation and data) from the first queue and performing the task. In this way, the worker threads perform the tasks in the first queue.

However, there are certain types of operators that impose certain requirements on memory, such as only tasks related to the one operator can occur. In other words, during query plan execution including the operator, the operator requires exclusive use of the memory (or a defined portion of memory) to execute (in an optimal way) the task(s) while other one or more tasks (not associated with the operator) cannot be performed. In this way, the other tasks do not use the memory resources being used by the tasks associated with the exclusive use of the memory ("exclusive tasks").

Figure 1C:
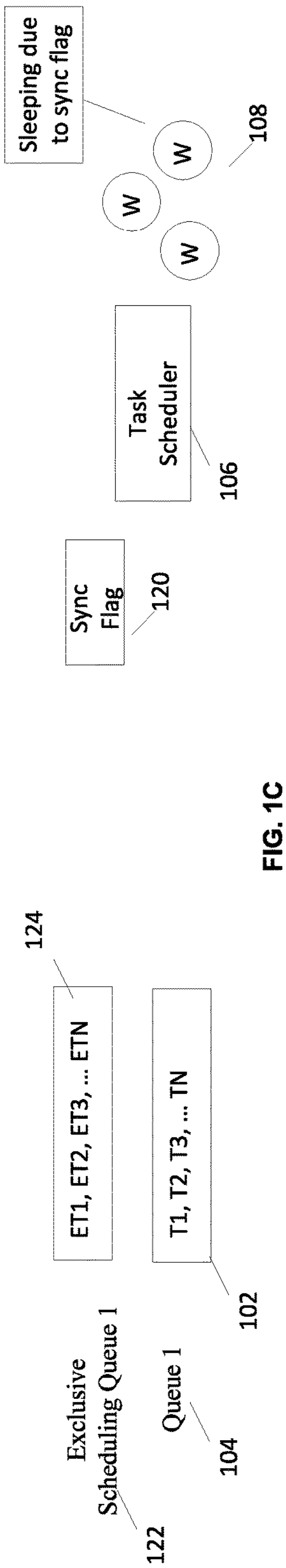
Figure 1D:
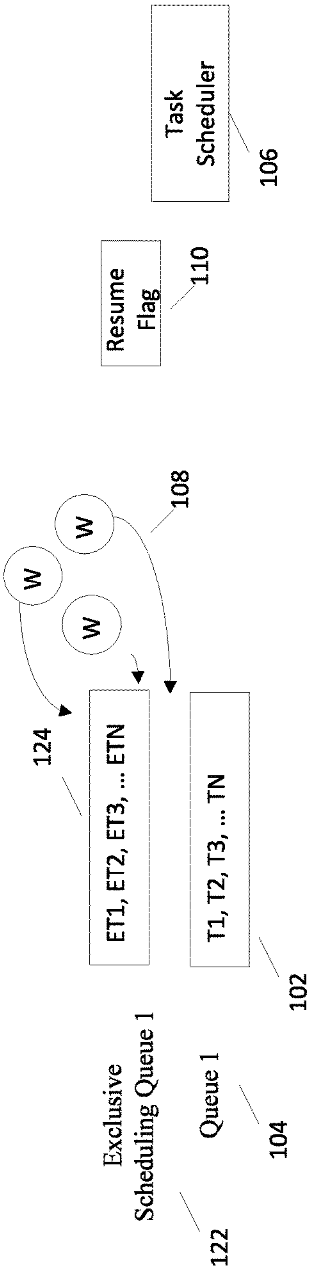
Figure 1E:
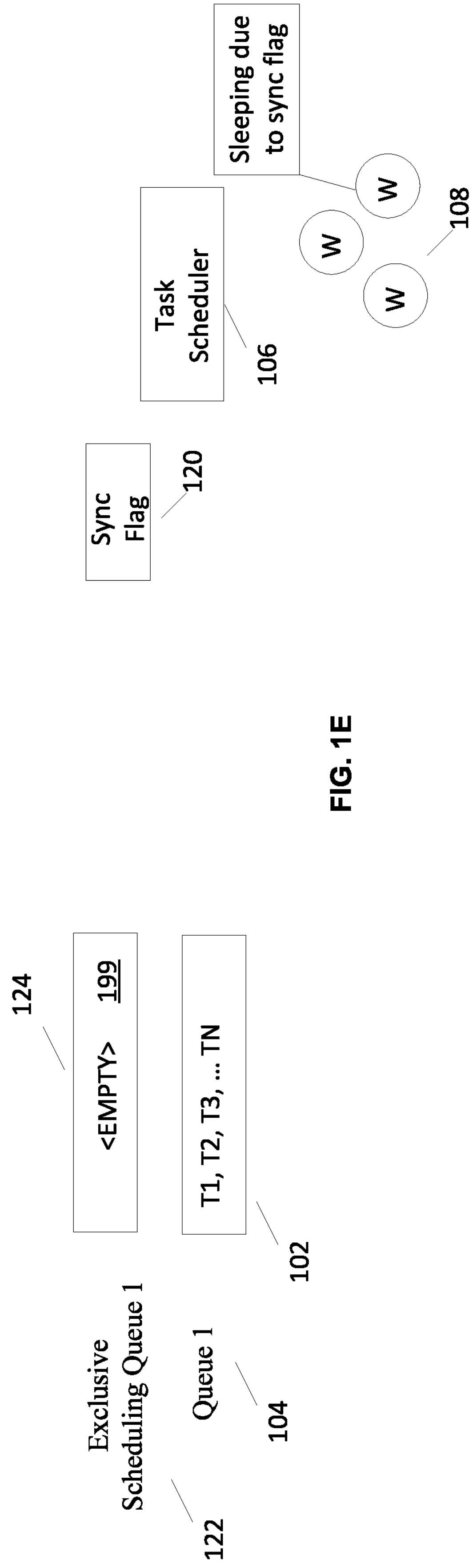
Figure 1F:
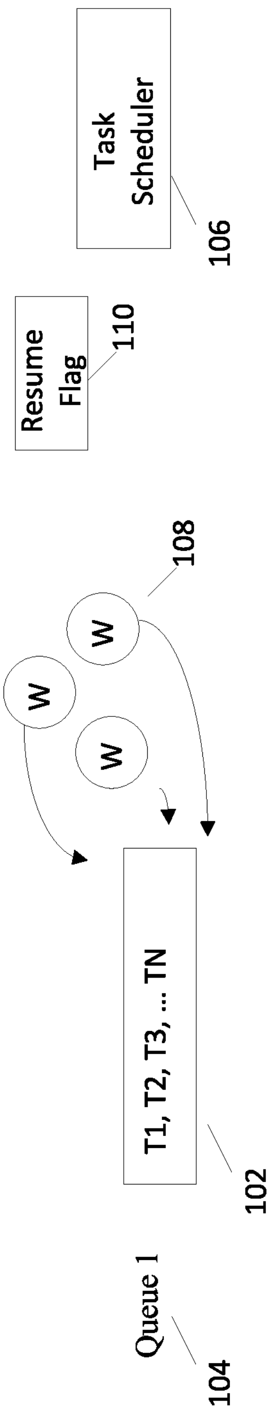
Figure 1G:
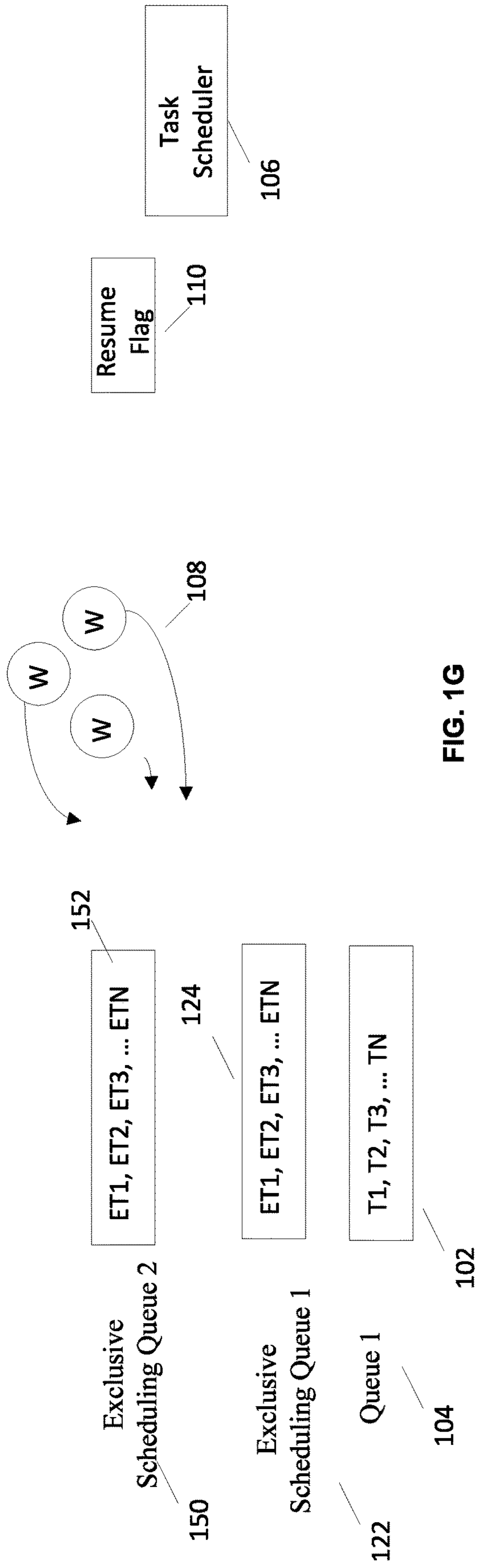
FIG. 1G depicts a recursive example of the exclusive scheduling of tasks, in accordance with some example implementations.
Figure 1H:
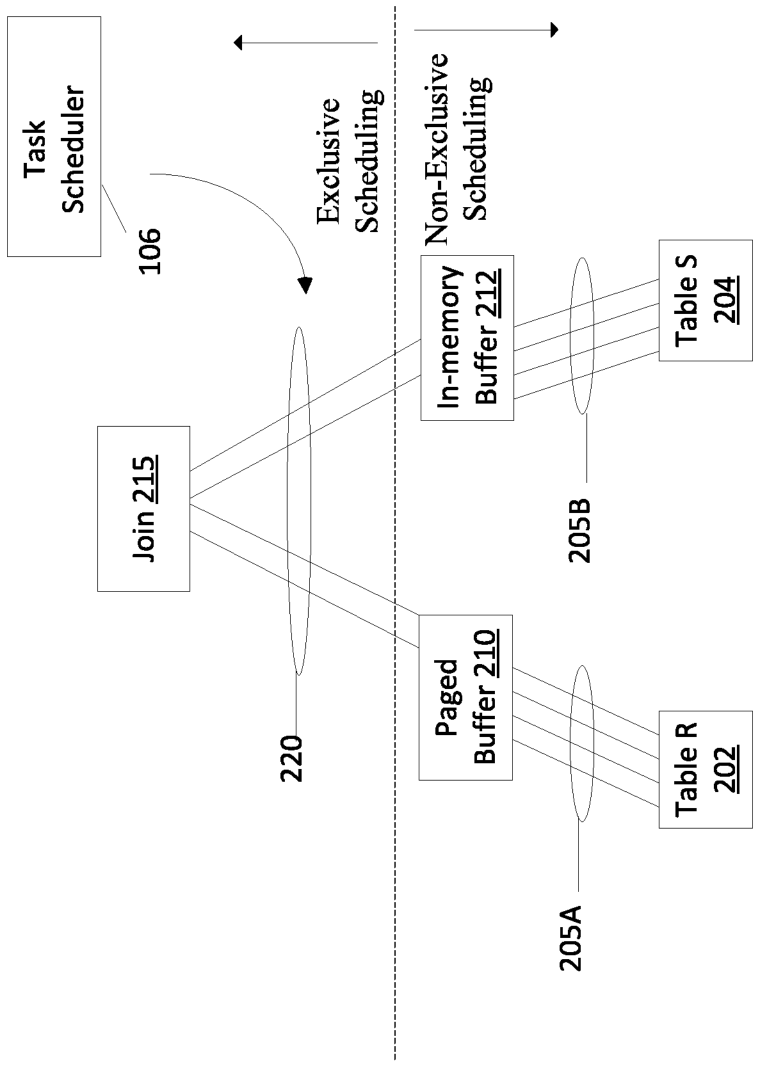
FIG. 1H depicts an example of a query that requires exclusive scheduling of tasks, in accordance with some example implementations

FIG. 1H depicts an example of a query plan for execution ("query plan execution") including a disk-nested-loop-join) that imposes certain requirements on memory. In the example of FIG. 1H, a join 215 is performed of a table R 202 (which is stored on disk rather than in-memory as it is very large) and a table S 204 (which is stored in-memory of the database). During query plan execution for example, the worker threads 205A work in parallel to copy table R into a paged buffer 210 (which is a disk based buffer), while worker threads 205B also work in parallel to copy table S into an in-memory buffer 212. However, when the join 215 (e.g., disk-nested-loop-join) of the page buffer 210 and in-memory buffer 212 occur, the task scheduler 106 exclusively schedules the worker threads 220 to exclusively work on the join 215 tasks, so as to avoid other worker threads from using the limited amount of in-memory resources.

FIG. 1C depicts an example of the exclusively scheduling of worker threads, in accordance with some implementations. When the query for the join 215 noted above with respect to FIG. 1H is to be processed, the tasks need to be scheduled exclusively such that other tasks not related to the join 215 are not performed. To that end, the task scheduler 106 sets a flag, such as a synchronize (sync) flag 120. The sync flag 120 indicates to the worker threads 108 at FIG. 1C to stop working on the tasks 102 (e.g., task T1, task T2, task T3, and so forth to task TN) of the first queue 104 (which are related to other operators and not the join 215 that requires exclusive scheduling). Next, the task scheduler creates an exclusive scheduling task queue 122 containing exclusive tasks 124 (e.g., task ET1, task ET2, task ET3, and so forth to task ETN). For example, the exclusive task queue 122 can be pushed on top of the first queue 104 (e.g., pushed into stack in-memory), so the first queue 102 is saved but not accessible to the worker threads 108. Next, the task scheduler sets the flag to resume 110 as shown at FIG. 1D. In response to the flag being set to resume at FIG. 1D, the worker threads 108 (which were previously sleeping) check the resume flag 110 and resume taking tasks from the exclusive scheduling queue 122.

When the exclusive scheduling queue 122 is empty 199 of tasks 124 as shown at FIG. 1E, the task scheduler 106 resets the flag to sync 120, so the worker threads 108 stop working on tasks. Next, the task scheduler pops the exclusive scheduling queue 122 to expose the first queue 104 and then resets the flag to resume 110 as shown at FIG. 1F, so the worker threads can resume working on the tasks in the first task queue.

Before providing additional description regarding exclusive scheduling of tasks for certain operators, the following provides description regarding an example database management system.

Figure 2A:
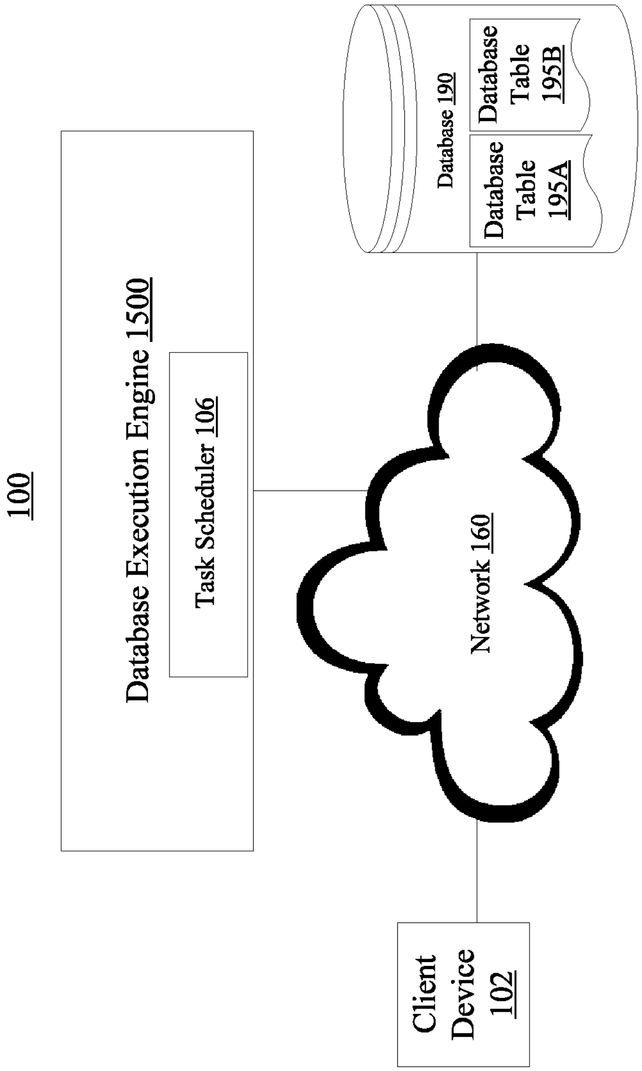
FIGS. 2A and 2B depict examples of system including a database execution engine configured to provide exclusive scheduling of tasks, in accordance with some example implementations.

FIG. 2A depicts a system diagram illustrating an example of a system 100, in accordance with some example implementations. Referring to FIG. 2A, the system 100 may include one or more client devices such as client device 102, a database execution engine 1500, and one or more databases, such as database 190. As shown in FIG. 2A, the one or more client devices 102, the database execution engine 1500, and the one or more databases 190 (which may include one or more database tables 195A-B) may be communicative coupled via a network 160. Although FIG. 2A depicts the execution engine as separate from the database 190, the database may include a database execution engine as well. The database execution engine 1500 may include a task scheduler 106 which as part of query execution exclusively schedules tasks, in accordance with some implementations.

The one or more databases 190 may include a variety of relational database technologies including, for example, an in-memory database, a column-based database, a row-based database, hybrid database (e.g., combination of column and row based), and/or the like. The one or more client devices 102 may include processor-based devices including, for example, a mobile device, a wearable apparatus, a personal computer, a workstation, an Internet-of-Things (IoT) appliance, and/or the like. The network 160 may be a wired network and/or wireless network including, for example, a public land mobile network (PLMN), a local area network (LAN), a virtual local area network (VLAN), a wide area network (WAN), the Internet, and/or the like.

Figure 2B:
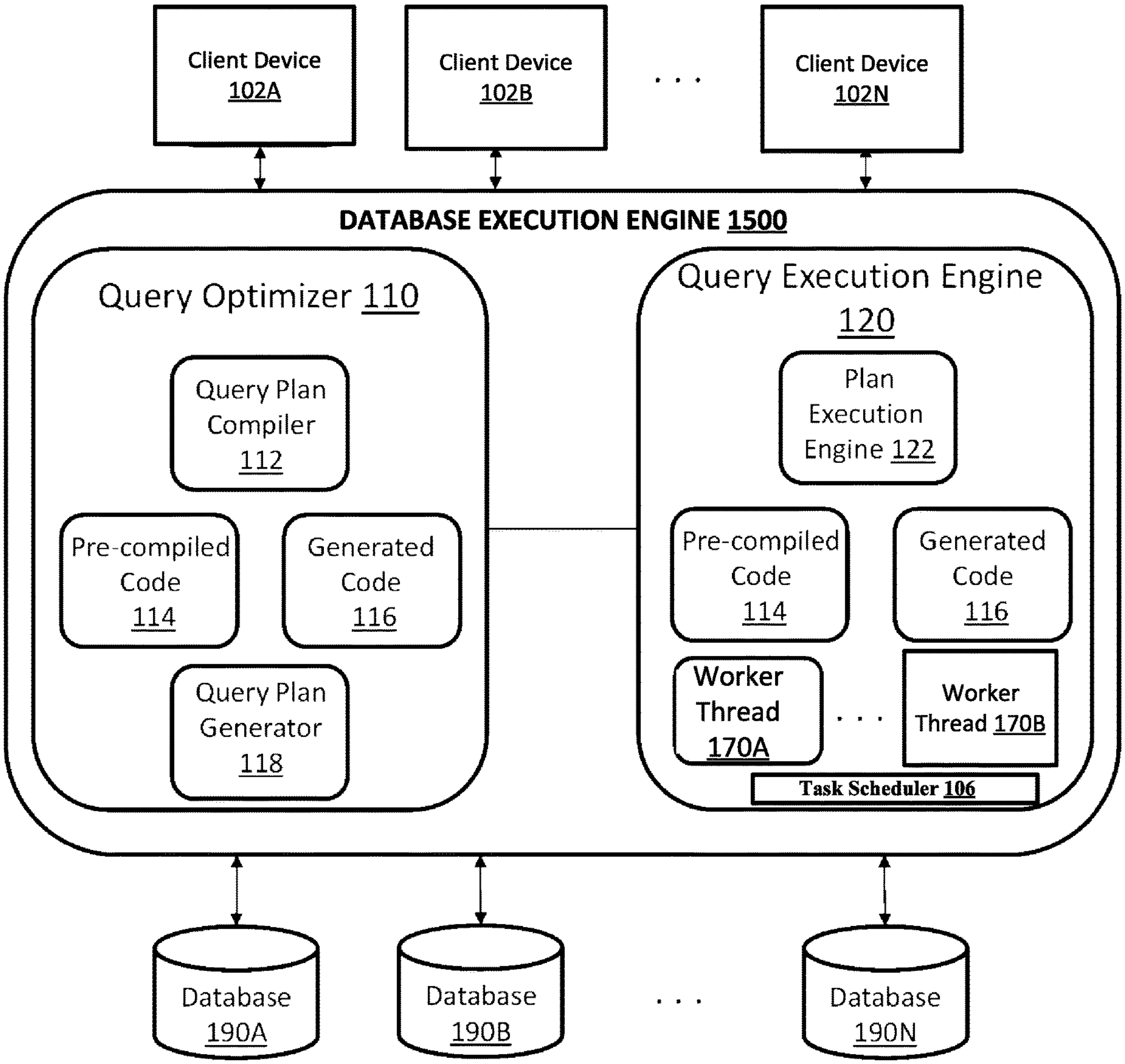

FIG. 2B depicts a block diagram illustrating an example implementation of the database execution engine 1500, in accordance with some example implementations. As noted, the database execution engine 1500 includes a task scheduler 106 (which as part of query execution) exclusively schedules work threads 170A-B to perform tasks, in accordance with some implementations. Although FIG. 2BA depicts the execution engine as separate from the databases 190A-N, a database may include a database execution engine as well.

As shown in FIG. 2B, the one or more databases 190 (which may include a first database 190A, a second database 190B, and a third database 190C) may represent a database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices, such as client devices 102A-N, may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, Wi-Fi links, and/or the like) provided, for example, by the network 160.

The database execution engine 1500 may include a query optimizer 110, such as an SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra" operators (e.g., relations) and may be in the form of a directed acyclic graph. The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

The query optimizer 110 may optimize the query plan (which may include the noted pipelines of operators) by compiling and generating code. Furthermore, the query optimizer may generate a DAG including operators that may be configured into one or more pipelines.

Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of one or more database 190A-N.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190A-N include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195A and/or 195B at the one or more databases 190, the database execution engine 1500 may divide the database table 195A and/or 195B into multiple partitions by applying one or more of a hash partitioning, round robin partitioning, and range partitioning.

Figure 3:
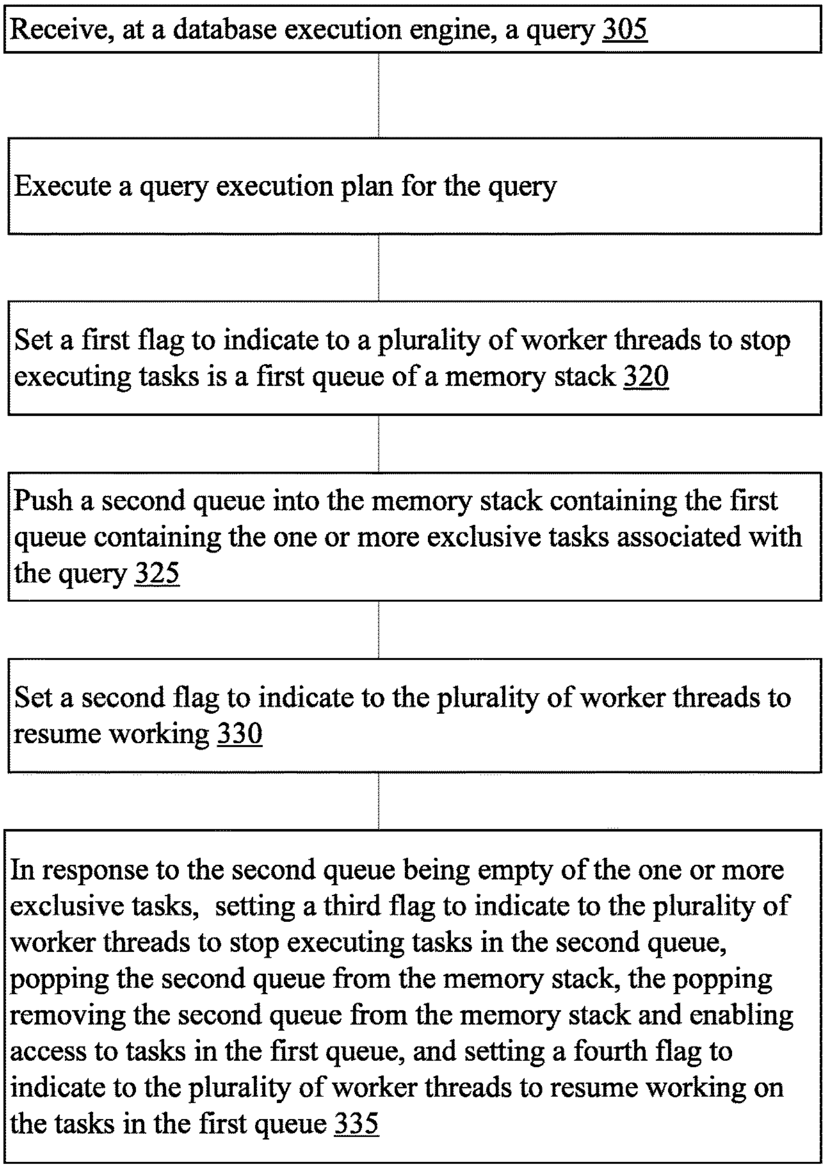
FIG. 3 depicts an example of a flow chart for a process for exclusive scheduling of tasks, in accordance with some example implementations.

FIG. 3 depicts a flowchart illustrating an example of a process 300 for exclusive scheduling of tasks for certain operators associated with a query, in accordance with some example implementations.

At 305, a query may be received at a database execution engine. For example, the database execution engine 1500 may receive a query from a client device, such as client user equipment 102A. And, the query may comprise for example a join, such as a disk-nested-loop-join as noted above with respect to FIG. 1H, that requires exclusive use of the in-memory to execute in an optimal way the tasks associated with the join (while other tasks (not associated with the query) are paused or stopped). As used herein, a database execution engine may refer to at least one processor and at least one memory configured with instructions to provide one or more of the aspects disclosed herein with respect to the database execution engine (e.g., receive a query, generate a query plan, optimize a query plan, and/or execute a query execution plan (or potion thereof).

One or more exclusive tasks (or the corresponding one or more operators for the task(s)) associated with the query may require exclusive scheduling. For example, the database execution engine may detect that the query and/or the operators for the query impose certain requirements on memory, such as the only the operations or tasks related to the query can occur in memory. For example, a scheduling operator in the query plan may be used, such that the scheduling operator at some point during query execution creates tasks representing small pieces of work necessary to complete the entire operation. The task scheduler 106 may include an interface through which the scheduling operator can submit these tasks that are then added to a task queue where the tasks may be picked up by the worker threads to process them. If an operator requires exclusive scheduling, the operator may access the interface to request exclusive scheduling, which then triggers the exclusive scheduling and/or the setting of the sync flag 120, which sends the workers to sleep as disclosed herein.

At 315, a query execution plan for the query may be executed (as part of query plan execution). Given a query for example, the database execution engine 1500 may first generate a query plan, and then generate a query execution plan comprising executable operators for example. The one or more executable operators may execute one or more tasks using worker threads. As noted, the worker thread" refers to a thread or thread of execution, which is a sequence of instructions managed independently by a scheduler, such as a task scheduler. During execution of the query execution plan, the task scheduler may, as noted, receive a request for exclusive scheduling, which then triggers the exclusive scheduling for the one or more exclusive tasks, and this request may also trigger (e.g., cause) the setting of the sync flag 120, which sends the workers to sleep as disclosed herein.

At 320, the database execution engine 1500 (and/or a task scheduler 106) may set a first flag to indicate to a plurality of worker threads to stop executing tasks in a first queue of a memory stack. For example, the task scheduler 106 may set a first flag to "sync" 120 to indicate to a plurality of worker threads 108 to stop executing tasks in a first queue 120 of a memory stack. In other words, setting the first flag to "sync" causes the plurality of worker threads (which check on the state of the flag(s)) to sleep, such that execution of the tasks in the first queue stops.

At 325, a second queue may be pushed into the memory stack containing the first queue containing the one or more exclusive tasks associated with the query. The pushing inserts the one or more exclusive tasks and inhibits access to tasks in the first queue. For example, the database execution engine 1500 and/or the task scheduler 106 may push the exclusive scheduling queue 122 of tasks 124. The exclusive tasks refer to tasks that are being exclusively scheduled. The inhibited access refers the plurality of worker threads being prevented from accessing the tasks in the first queue.

At 330, a second flag is set (e.g., by the database execution engine and/or the task scheduler) to indicate to the plurality of worker threads to resume working. The plurality of worker threads may the access the one or more exclusive tasks of the second queue. For example, the task scheduler 106 may set the flag to resume 110 to indicate to the plurality of worker threads to resume working on the exclusive scheduling queue 122 of tasks 124. In other words, the setting of the second flag (such as the resume 110) causes the plurality of worker threads (which check the second flag from time to time) to resume access to the one or more exclusive tasks in the second queue.

In response to the second queue being empty of the one or more exclusive tasks, a third flag may, at 335, be set (e.g., by the database execution engine 1500 and/or the task scheduler 106) to indicate to the plurality of worker threads to stop executing tasks in the second queue. For example, the task scheduler 106 may detect the exclusive scheduling queue 122 no longer contains tasks 124, in which case the task scheduler may set the third flag to sync 120 to indicate to the plurality of worker threads 108 (which from time to time check the third flag) to stop executing tasks in the exclusive scheduling queue 122.

Moreover, in response to the second queue being empty of the one or more exclusive tasks, the second queue is popped, at 335, from the memory stack. The popping of the second queue removes the second queue from the memory stack and thus enables access to tasks in the first queue. For example, the database execution engine 1500 and/or the task scheduler 106 may pop the exclusive scheduling queue 122 exposing the first queue 104 of tasks 102 to the worker threads.

Moreover, in response to the second queue being empty of the one or more exclusive tasks, a fourth flag may, at 335, be set to indicate to the plurality of worker threads to resume working on the tasks in the first queue. For example, the database execution engine 1500 and/or the task scheduler 106 may set a fourth flag to resume 110 to indicate to the plurality of worker threads 108 (which check the fourth flag from time to time) to resume working on the tasks 102 in the first queue 104.

Figure 4:
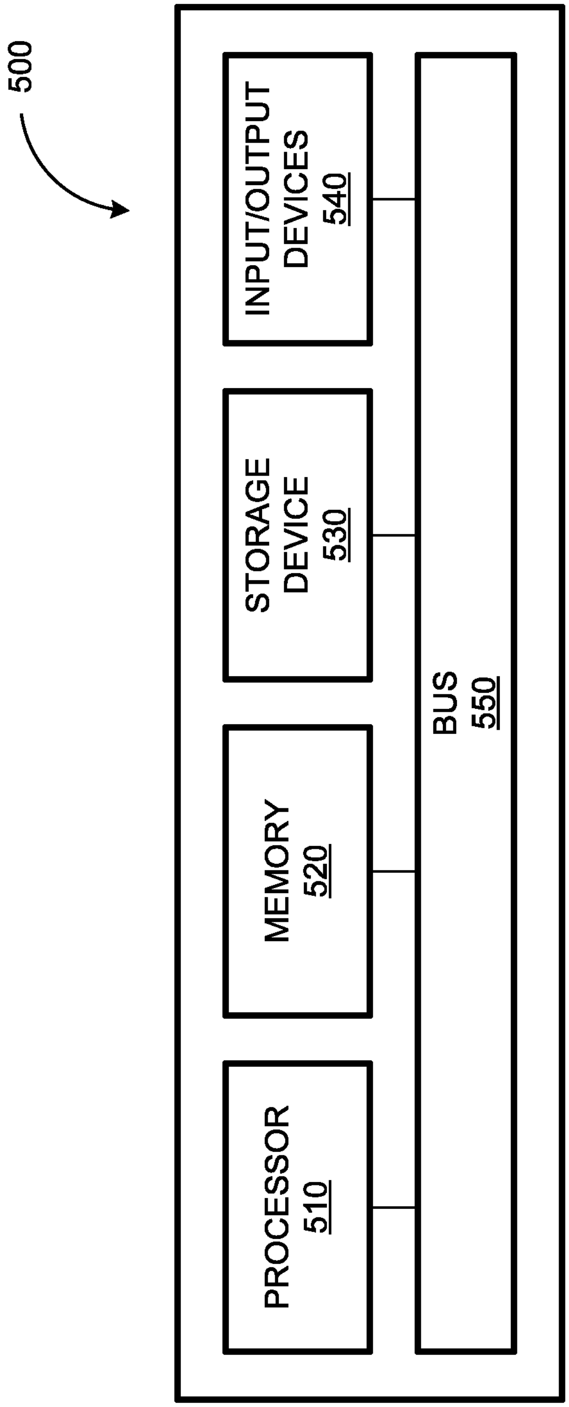
FIG. 4 depicts a block diagram illustrating an example of a computing system, in accordance with some example implementations.

FIG. 4 depicts a block diagram illustrating an example of a computing system 500 consistent with implementations of the current subject matter. Referring to FIGS. 1-4, the computing system 500 may implement the database execution engine 1500 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 1500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method comprising:

executing a query execution plan for a query;

setting a first flag to indicate to a plurality of worker threads to stop executing tasks in a first queue of a memory stack;

pushing into the memory stack, a second queue containing one or more exclusive tasks associated with the query;

setting a second flag to indicate to the plurality of worker threads to resume working; and in response to the second queue being empty of the one or more exclusive tasks, setting a third flag to indicate to the plurality of worker threads to stop executing tasks in the second queue, popping the second queue from the memory stack, the popping removing the second queue from the memory stack and enabling access to tasks in the first queue, and setting a fourth flag to indicate to the plurality of worker threads to resume working on the tasks in the first queue.

Example 2: The method of Example 1, further comprising:

receiving, at a database execution engine, the query from a client device.

Example 3: The method of any of Examples 1-2, wherein during execution of the query execution plan, a task scheduler comprised in a database execution engine receives a request for exclusive scheduling of the one or more exclusive tasks.

Example 4: The method of any of Examples 1-3, wherein the request causes the setting of the first flag to indicate to the plurality of worker threads to stop executing tasks in the first queue of the memory stack.

Example 5: The method of any of Examples 1-4, wherein the first flag causes the plurality of worker threads to sleep, such that execution of the tasks in the first queue stops.

Example 6: The method of any of Examples 1-5, wherein the pushing the one or more exclusive tasks into the memory stack inserts the one or more exclusive tasks into the memory stack.

Example 7: The method of any of Examples 1-6, wherein the pushing the one or more exclusive tasks into the memory stack inhibits access to the tasks in the first queue.

Example 8: The method of any of Examples 1-7, wherein the inhibited access to the tasks in the first queue inhibits the plurality of worker threads from accessing the tasks in the first queue.

Example 9: The method of any of Examples 1-8, wherein the setting of the second flag causes the plurality of worker threads to resume access the one or more exclusive tasks in the second queue.

Example 10: A system comprising:

at least one processor; and at least one memory including program code, which when executed by the at least one processor causes operations comprising:

executing a query execution plan for a query;

setting a first flag to indicate to a plurality of worker threads to stop executing tasks in a first queue of a memory stack;

pushing into the memory stack, a second queue containing one or more exclusive tasks associated with the query;

setting a second flag to indicate to the plurality of worker threads to resume working; and in response to the second queue being empty of the one or more exclusive tasks, setting a third flag to indicate to the plurality of worker threads to stop executing tasks in the second queue, popping the second queue from the memory stack, the popping removing the second queue from the memory stack and enabling access to tasks in the first queue, and setting a fourth flag to indicate to the plurality of worker threads to resume working on the tasks in the first queue.

Example 11: The system of Example 10, further comprising:

receiving, at a database execution engine, the query from a client device.

Example 12: The system of any of Examples 10-11, wherein during execution of the query execution plan, a task scheduler comprised in a database execution engine receives a request for exclusive scheduling of the one or more exclusive tasks.

Example 13: The system of any of Examples 10-13, wherein the request causes the setting of the first flag to indicate to the plurality of worker threads to stop executing tasks in the first queue of the memory stack.

Example 14: The system of any of Examples 10-13, wherein the first flag causes the plurality of worker threads to sleep, such that execution of the tasks in the first queue stops.

Example 15: The system of any of Examples 10-14, wherein the pushing the one or more exclusive tasks into the memory stack inserts the one or more exclusive tasks into the memory stack.

Example 16: The system of any of Examples 10-15, wherein the pushing the one or more exclusive tasks into the memory stack inhibits access to the tasks in the first queue.

Example 17: The system of any of Examples 10-16 wherein the inhibited access to the tasks in the first queue inhibits the plurality of worker threads from accessing the tasks in the first queue.

Example 18: The system of any of Examples 10-17, wherein the setting the second flag causes the plurality of worker threads to resume access the one or more exclusive tasks in the second queue.

Example 19: A non-transitory computer-readable storage medium including program code, which when executed by the at least one processor causes operations comprising:

executing a query execution plan for a query;

setting a first flag to indicate to a plurality of worker threads to stop executing tasks in a first queue of a memory stack;

pushing into the memory stack, a second queue containing one or more exclusive tasks associated with the query;

setting a second flag to indicate to the plurality of worker threads to resume working; and in response to the second queue being empty of the one or more exclusive tasks, setting a third flag to indicate to the plurality of worker threads to stop executing tasks in the second queue, popping the second queue from the memory stack, the popping removing the second queue from the memory stack and enabling access to tasks in the first queue, and setting a fourth flag to indicate to the plurality of worker threads to resume working on the tasks in the first queue.

Example 20: The non-transitory computer-readable storage medium of Example 20, further comprising:

receiving, at a database execution engine, the query from a client device.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving, at a database execution engine and from a client device, a database query comprising executable operators including a disk-nested loop join that requires exclusive use of memory resources of the database execution engine;

in response to receiving the database query, executing, by the database execution engine, a query execution plan for the database query, the query execution plan comprising a directed acyclic graph that indicates links between the executable operators configured to execute tasks using a plurality of worker threads;

determining, by the database execution engine, that the disk-nested loop join is associated with one or more exclusive tasks among the tasks requiring the exclusive use of memory resources of the database execution engine;

setting, by the database execution engine, a first flag to indicate to the plurality of worker threads to stop executing tasks in a first queue of a memory stack;

pushing, by the database execution engine, into the memory stack, a second queue containing the one or more exclusive tasks, wherein the pushing inserts the one or more exclusive tasks into the memory stack and inhibits access by the plurality of worker threads to the tasks in the first queue;

setting, by the database execution engine, a second flag to indicate to the plurality of worker threads to access the second queue and resume working on the one or more exclusive tasks in the second queue; and in response to the second queue being empty of the one or more exclusive tasks, setting, by the database execution engine, a third flag to indicate to the plurality of worker threads to stop executing tasks in the second queue, popping the second queue from the memory stack to remove the second queue from the memory stack and re-enable access by the plurality of worker threads to the tasks in the first queue, and setting a fourth flag to indicate to the plurality of worker threads to resume working on the tasks in the first queue.

2. The method of claim 1, wherein during execution of the query execution plan, a task scheduler comprised in the database execution engine receives a request for exclusive scheduling of the one or more exclusive tasks.

3. The method of claim 2, wherein the request causes the setting of the first flag to indicate to the plurality of worker threads to stop executing tasks in the first queue of the memory stack.

4. The method of claim 1, wherein the first flag causes the plurality of worker threads to sleep, such that execution of the tasks in the first queue stops.

5. A system comprising:

at least one processor; and at least one memory including program code, which when executed by the at least one processor causes operations comprising:

receiving, at a database execution engine and from a client device, a database query comprising executable operators including a disk-nested loop join that requires exclusive use of memory resources of the database execution engine;

in response to receiving the database query, executing, by the database execution engine, a query execution plan for the database query, the query execution plan comprising a directed acyclic graph that indicates links between the executable operators configured to execute tasks using a plurality of worker threads;

determining, by the database execution engine, that the disk-nested loop join is associated with one or more exclusive tasks among the tasks requiring the exclusive use of memory resources of the database execution engine;

setting, by the database execution engine, a first flag to indicate to the plurality of worker threads to stop executing tasks in a first queue of a memory stack;

pushing, by the database execution engine, into the memory stack, a second queue containing the one or more exclusive tasks, wherein the pushing inserts the one or more exclusive tasks into the memory stack and inhibits access by the plurality of worker threads to the tasks in the first queue;

setting, by the database execution engine, a second flag to indicate to the plurality of worker threads to access the second queue and resume working on the one or more exclusive tasks in the second queue; and in response to the second queue being empty of the one or more exclusive tasks, setting, by the database execution engine, a third flag to indicate to the plurality of worker threads to stop executing tasks in the second queue, popping the second queue from the memory stack to remove the second queue from the memory stack and re-enable access by the plurality of worker threads to the tasks in the first queue, and setting a fourth flag to indicate to the plurality of worker threads to resume working on the tasks in the first queue.

6. The system of claim 5, wherein during execution of the query execution plan, a task scheduler comprised in the database execution engine receives a request for exclusive scheduling of the one or more exclusive tasks.

7. The system of claim 6, wherein the request causes the setting of the first flag to indicate to the plurality of worker threads to stop executing tasks in the first queue of the memory stack.

8. The system of claim 5, wherein the first flag causes the plurality of worker threads to sleep, such that execution of the tasks in the first queue stops.

9. A non-transitory computer-readable storage medium including program code, which when executed by the at least one processor causes operations comprising:

receiving, at a database execution engine and from a client device, a database query comprising executable operators including a disk-nested loop join that requires exclusive use of memory resources of the database execution engine;

in response to receiving the database query, executing, by the database execution engine, a query execution plan for the database query, the query execution plan comprising a directed acyclic graph that indicates links between the executable operators configured to execute tasks using a plurality of worker threads;

determining, by the database execution engine, that the disk-nested loop join is associated with one or more exclusive tasks among the tasks requiring the exclusive use of memory resources of the database execution engine;

setting, by the database execution engine, a first flag to indicate to the plurality of worker threads to stop executing tasks in a first queue of a memory stack;

pushing, by the database execution engine, into the memory stack, a second queue containing the one or more exclusive tasks, wherein the pushing inserts the one or more exclusive tasks into the memory stack and inhibits access by the plurality of worker threads to the tasks in the first queue;

setting, by the database execution engine, a second flag to indicate to the plurality of worker threads to access the second queue and resume working on the one or more exclusive tasks in the second queue; and in response to the second queue being empty of the one or more exclusive tasks, setting, by the database execution engine, a third flag to indicate to the plurality of worker threads to stop executing tasks in the second queue, popping the second queue from the memory stack to remove the second queue from the memory stack and re-enable access by the plurality of worker threads to the tasks in the first queue, and setting a fourth flag to indicate to the plurality of worker threads to resume working on the tasks in the first queue.

* * * * *